3,510,327
STABLE PHOSPHORUS CONTAINING SOLUTIONS
George T. Miller, Lewiston, N.Y., assignor to Hooker Chemical Corporation, Niagara Falls, N.Y., a corporation of New York
No Drawing. Filed Nov. 4, 1968, Ser. No. 773,334
Int. Cl. C08h 17/30; C23f 17/00
U.S. Cl. 106—287                                    5 Claims

ABSTRACT OF THE DISCLOSURE

A stable solution of phosphorus and trichloroethylene, which solution contains a stabilizing amount of a stabilizer composition, the stabilizer comprising at least one of a lower aliphatic alcohol, a cycloaliphatic alcohol or an alkyl substituted thiourea. Preferably, the stabilizer composition is a combination of a lower aliphatic or cycloaliphatic alcohol and a polyhydroxy aromatic compound, or an alkyl substituted thiourea. The preferred alcohol in the stabilizer composition is butanol, the preferred polyhydroxy aromatic compound is resorcinol, and the preferred alkyl substituted thiourea is 1,3-diethyl-2-thiourea. The resulting stabilized trichloroethylene solution is substantially free of any phosphorus scum or precipitate, even after heating for prolonged periods, and is suitable for use as a preplating treating composition in processes for the metal plating of plastic and related processes.

---

The present invention relates to a stable organic solvent solution of phosphorus and more particularly it relates to a method of stabilizing a solution of white phosphorus in trichloroethylene so as to minimize the formation of phosphorus scum or precipitation in the solution, even after prolonged periods of heating.

Recently, there has developed considerable interest in the production of metal plated plastic articles. The use of such articles has become increasingly prevalent in various industries, including the automotive industry, appliance industry, and the like. As a result, numerous processes have been devised for the production of such metal plated plastic articles.

One such process, which represents an improvement over the heretofore known processes, in terms of simplified operation and the variety of plastic substrates which may be plated, involves the pretreatment of the plastic surface with phosphorus in an organic solvent. Phosphorus is deposited at the plastic surface, which surface is then contacted with a metal salt or complex to form a metal-phosphorus compound, the resulting treated surface being either conductive or capable of catalyzing the reduction of a metal salt to produce a conductive surface. These conductive surfaces may then be readily electroplated by conventional means.

In the practice of the above process, particularly with respect to the use of the organic solvent solution of phosphorus, it has been found that a scum or precipitate of phosphorus is formed in the organic solvent solution. This formation of phosphorus precipitate is accelerated at the elevated temperatures at which the organic solvent solution of phosphorus is normally used. The formation of this phosphorus scum or precipitate is objectionable, not only from the standpoint of its deposition on the plastic surfaces being treated, but also from the fact that its formation removes phosphorus values from the solution, thus adding to the overall cost of the process.

It is, therefore, an object of the present invention to provide a stable, organic solvent solution of phosphorus.

A further object of the present invention is to provide a stable solvent solution of phosphorus, which solution is suitable for use in pretreatment of plastic surfaces in a process for the metal plating of plastics.

These and other objects will become apparent to those skilled in the art from the description of the invention which follows.

Pursuant to the above objects, the present invention includes a stable organic solvent-phosphorus composition which comprises trichloroethylene, white phosphorus, and a stabilizing amount of a stabilizer comprising at least one of a lower aliphatic alcohol, a cycloaliphatic alcohol and an alkyl thiourea. This composition is found to be suitable as a preplate treatment in processes for the metal plating of plastic and is stable to the formation of a phosphorus sludge or precipitate even after heating for extended periods of time.

More specifically, in the practice of the present invention, the subject stable, organic solvent-phosphorus composition contains trichloroethylene in an amount sufficient to form such composition containing the desired amount of phosphorus. The trichloroethylene is desirably present in the composition in an amount within the range of about 50 to 99.9+% by weight of the composition and is preferably present in an amount within the range of about 80 to 99%.

The phosphorus is present in the subject composition in an amount which is at least sufficient to provide for the desired deposition of phosphorus on the plastic surface which is treated therewith. Desirably, the composition contains the phosphorus in an amount within the range of about 0.0001% by weight of the solution up to an amount sufficient to provide a saturated solution of phosphorus, with amounts within the range of about 0.01% to 2.5% by weight of the solution being preferred. It is to be appreciated, that the phosphorus utilized in the present composition is the so-called white or yellow phosphorus.

In addition to the trichloroethylene and white phosphorus, the compositions of the present invention also contain a stabilizing amount of a stabilizer which is effective in minimizing the formation of phosphorus scum or precipitate in the solution. In one embodiment, this stabilizer composition may comprise at least one of a lower aliphatic alcohol, a cycloaliphatic alcohol and an alkyl substituted thiourea. While such stabilizer composition is effective in many instances, it has been found that even greater stabilization effectiveness is obtained by the use of a two component stabilizer which comprises a first component selected from lower aliphatic and cycloaliphatic alcohols and a second component selected from polyhydroxyaromatic compounds and alkyl substituted thioureas. Such two component system has been found to provide stabilization over extended periods of time and, thus, constitute the preferred embodiment of the present invention.

Typically, an effective stabilizing amount of the stabilizer in the composition is an amount which is at least about 0.0002% by weight of the composition, with amounts of the stabilizer within the range of about 0.01 to 15% by weight of the composition being preferred. In the preferred embodiment the first stabilizer component, i.e., the lower aliphatic or cycloaliphatic alcohol, is desirably present in an amount within the range of about 50 to 99.9% by weight of the stabilizer composition, with amounts within the range of about 95 to 99.9% by weight of the stabilizer composition being preferred. The second stabilizer component, i.e., the polyhydroxyaromatic compound or the alkyl substituted thiourea, is desirably present in an amount within the range of about 0.1 to 50% by weight of the stabilizer composition and is preferably present in an amount within the range of about 0.1 to 5% by weight of the stabilizer composition.

The alcohols which make up the first component of the stabilizer compositions are typically, alcohols which contain from about 1 to 18 carbon atoms in a straight, branched, or cyclic chain. Preferably, the alcohols used contain less than 10 carbon atoms with alcohols containing from about 2 to 6 carbon atoms being most preferred. Examples of suitable alcohols which may be used as the first component of the stabilizer composition are methyl alcohol, ethyl alcohol, n-propyl alcohol, isopropyl alcohol, n-butyl alcohol, isobutyl alcohol, tertiary butyl alcohol, secondary butyl alcohol, n-amyl alcohol, secondary amyl alcohol, isoamyl alcohol, tertiary amyl alcohol, cyclohexyl alcohol, octyl alcohol, decyl alcohol, lauryl alcohol stearyl alcohol, and the like, including mixtures of one or more of these alcohols. Of the numerous alcohols which may be used, in many instances, the preferred alcohol stabilizer has been found to be normal butyl alcohol and, for this reason, primary reference hereinafter will be made to this material. This is not, however, to be taken as a limitation of the present invention as other alcohols may also be used with comparable results.

The polyhydroxy aromatic compounds which may be selected as the second stabilizer component is desirably either a polyhydroxy benzene or a polyhydroxy naphthalene. In the latter instance, the hydroxy groups may both be located on the same ring or on separate rings. The polyhydroxy benzene or polyhydroxy naphthalene may be substituted with one or more alkyl groups containing from about 1 to 5 carbon atoms. It is to be appreciated that although it is preferred to use a polyhydroxy aromatic compound which contains from about 2 to 3 hydroxy groups and from 1 to 2 aromatic rings, compounds containing more than 3 hydroxy groups and/or two aromatic rings may also be used, provided they are effective as stabilizer components and do not deleteriously affect the overall composition.

Exemplary of typical specific polyhydroxy compounds which may be used are resorcinol; hydroquinone; pyrocatechol; 3-methylpyrocatechol; 4-ethylcatechol; 3-tertiaryamylpyrocatechol; 3,5-dimethylpyrocatechol; 3,4-dimethylpyrocatechol; 4-tertiarybutylpyrocatechol; 4,5-diethylpyrocatechol; 3,4,5-tributylpyrocatechol; 3,4,6-trimethylpyrocatechol; 2-methylresorcinol; 4-methylresorcinol; 5-tertiaryamylresorcinol; 4,5-diteritarybutylresorcinol; 4,6-dimethylresorcinol; 2-methyl-4,6-ditertiarybutylresorcinol; 2-methylhydroquinone; 2,3-dimethylhydroquinone; 2,6-diethylhydroquinone; 2,3-ditertiaryamylhydroquinone; 2,3,5-trimethylhydroquinone; 1,2-dihydroxynaphthalene; 5,6-dimethyl-1,2-dihydroxynaphthalene; 1,5-dihydroxynaphthalene; 3-tertiarybutyl-1,5-dihydroxynaphthalene; 3,4-dimethyl-1,5-dihydroxynaphthalene; 1,6-dihydroxynaphthalene; 4,5-dipropyl-1,6-dihydroxynaphthalene; 1,2,3-benzenetriol; 1,2,4-benzene triol; 1,3,5-benzene triol; 1,2,3-trihydroxynaphthalene; 1,2,6-trihydroxynaphthalene; 1,2,7-trihydroxynaphthalene; and the like.

The alkyl thiourea compounds from which the second stabilizer component may be selected, a lower alkyl substituted thiourea having the formula:

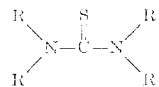

wherein the R groups are each independently selected from the group consisting of hydrogen and lower alkyl groups containing from 1 to 4 carbon atoms, at least one of the R groups being other than hydrogen.

Exemplary of typical lower alkyl substituted thiourea compounds which are suitable are methyl thiourea; ethylthiourea, n-propylthiourea; n-butylthiourea; isopropylthiourea; isobutylthiourea; tertiarybutyl thiourea; N,N'-dimethylthiourea; N,N'-diethylthiourea; N,N'-di-n-propylthiourea; N,N'-di-n-butylthiourea; N,N'-diisopropylthiourea; N,N,N'-tripropylthiourea; N,N,N'-tri-n-butylthiourea; N,N,N',N'-tetramethylthiourea; N,N,N',N'-tetrapropylthiourea; N,N,N',N-tetra-n-butylthiourea; N,N-di-methyl-N',N'-diethylthiourea; N,N-diethyl-N',N'-dipropylthiourea; N,N-dimethyl-N',N'-di-n-butylthiourea; N,N'-dimethyl-N,N'-diethylthiourea, and the like. These lower alkyl substituted thioureas may be compounds wherein the lower alkyl substitutents are all the same or different. Moreover, they may be either symmetrical or unsymmetrical lower alkyl substituted thioureas.

The stabilized trichloroethylene-phosphorus compositions of the present invention may be formulated by admixing the above-described components in amounts within the ranges which have been indicated. Although this admixing may be carried out in any suitable manner, preferably, the stabilizer components are first admixed with the trichloroethylene and, thereafter, the phosphorus is added to the trichloroethylene containing the stabilizers.

The thus-formulated solvent solution may be utilized as such or, if desired, it may be formed into a water emulsion by emulsifying it with water and a suitable emulsifying agent, water in amounts of from about 40 to 70 parts by weight per hundred parts of emulsion, being typical. Suitable emulsifying agents which may be used include anionic, cationic and non-ionic surface active agents such as the mono- and di-alkyl oxy(ethyleneoxy) ethanols; fatty acid esters of polyhydric alcohols or ether alcohols; alkali metal alkyl benzene sulfonates; alkali metalalkyl sulfates; sulfonated aliphatic polyesters; free acid and sodium salts of complex phosphate esters; alkali metal lignin sulfonates; fatty amides of monoethanolamines; fatty nitriles; fatty acid amides; polyoxyethylated alkyl amines; and the like.

The stabilized, phosphorus-containing trichloroethylene compositions, either as a solution or an emulsion, as described above, may then be used as a pretreatment for plastic surfaces in a process for the metal plating of plastic. In such a process, the surface of the plastic article to be treated is contacted with the phosphorus-containing trichloroethylene composition for a period sufficient to effect deposition of the desired amount of phosphorus at the surface of the plastic article. The contact time will, of course, vary depending upon the nature of the plastic, the makeup of the coating composition and the temperature at which it is used. Typically, contact times may be within the range of about 1 second to an hour or more, with times within the range of about 1 to 20 minutes being preferred. The treatment with the phosphorus-containing trichloroethylene composition is carried out at a temperature which is below the softening point of the plastic being treated and also below the boiling point of the solvent. Desirably, the temperatures used are within the range of about 30 to 135 degrees centigrade, with temperatures within the range of about 50 to 100 degrees centigrade being preferred. It is found, that when operating in this manner, little or no phosphorus sludge is formed in the treating compositions, even after they have been used for an extended period of time.

Following the treatment of the plastic surfaces with the phosphorus-containing trichloroethylene solution, the surfaces may be contacted with a solution of a metal salt or a complex of a metal salt which is capable of reacting with the phosphorus to form a metal phosphide. Typical of the metal salt solutions which may be used are solutions of copper sulfate, copper chloride, silver nitrate, nickel cyanide, nickel sulfate, and the like. Thereafter, the treated plastic surfaces may be subjected to an electroless or chemical plating process wherein the surface is contacted with a solution of a metal salt so that the metallic ion of the metal salt is reduced to the metallic state and deposited on the treated plastic surface. Typical of such processes are those for the deposition of a nickel coating, which processes may use a solution of a nickel salt in an aqueous hypophosphite or borohydride solution. The thus-treated plastic surface may then be electroplated, using conventional electroplating processes, to produce a metal plated plastic article. The above-described process for the treatment of the plastic surfaces is set forth in detail in commonly assigned co-pending applications Ser. No. 614,541, filed Feb. 8, 1967 and Ser. No. 683,793, filed Nov. 17, 1967.

In order that those skilled in the art may better understand the present invention and the manner in which it may be practiced, the following specific examples are given. In these examples, unless otherwise indicated, parts and percents are by weight and temperatures are in degrees centigrade. It is to be appreciated, however, that these examples are merely exemplary of the present invention and are not to be taken as a limitation thereof.

In the following examples, a solution was made of trichloroethylene containing 2% by weight of white phosphorus. Various stabilizing components were added to this solution and the resulting solutions were heated at 60 degrees centigrade. Following the heating, the solutions were observed to determine the amount of phosphorus precipitate or scum formed in the solution. Using this procedure, the following results were obtained:

| Ex. | Stabilizer-amount (%) | Heating time (hours) | Results |
|---|---|---|---|
| 1 | None | 19 | Very heavy P scum. |
| 2 | n-Butanol, 1% | 19 | Heavy P scum. |
| 3 | n-Butanol, 5% | 48 | Yellow P ppt. |
| 4 | n-Butanol, 10% | 72 | Do. |
| 5 | 1,3-diethyl-2-thiourea, 0.2% | 168 | Do. |
| 6 | n-Butanol, 5%, 1,3-diethyl-2-thiourea, 0.02%. | 432 | Clear, no P ppt. |
| 7 | n-Butanol, 1% hydroquinone, 0.2%. | 312 | Do. |
| 8 | n-Butanol, 1%, resorcinol, 0.02%. | 312 | Do. |
| 9 | 1-octadecanol, 5%, 1,3-diethyl-2-thiourea, 0.02%. | 432 | Do. |
| 10 | n-Butanol, 1%, 4-tertbutyl pyrocatechol, 0.02%. | 19 | Do. |
| 11 | n-Heptyl alcohol, 1% | 19 | Heavy P scum. |
| 12 | n-Heptyl alcohol, 1%, 1,3-diethyl-2-thiourea, 0.02%. | 19 | Clear, no P ppt. |
| 13 | Nonyl alcohol, 1%, 4-tertbutylpyrocatechol, 0.02%. | 19 | Do. |
| 14 | Tert-amyl alcohol, 1%, 1,3-diethyl-2-thiourea, 0.02%. | 19 | Do. |
| 15 | Isopropanol, 1%, 4-tertbutylpyrocatechol, 0.02%. | 19 | Do. |
| 16 | Cyclohexanol, 5%, 1,3-diethyl-2-thiourea, 0.02% | 120 | Do. |

The stable compositions of the preceeding examples are used to treat various plastic surfaces including polyvinyl chloride, polyethylene, and polypropylene, which surfaces may then be further treated and finally electro-plated with nickel, using the procedures set forth in the aforementioned U.S. Ser. No. 614,541 and Ser. No. 683,793.

While there have been described various embodiments of the invention, the compositions and methods are not intended to be understood as limiting the scope of the invention, as it is realized that changes therewithin are possible and it is intended that each element recited in the following claims is to be understood as referring to all equivalent elements for accomplishing substantially the same results in substantially the same or equivalent manner, it being intended to cover the invention broadly in whatever form its principle may be utilized.

What is claimed is:

1. A stable, organic solvent-phosphorus composition which comprises trichloroethylene, white phosphorus, and a stabilizing amount of a stabilizer, which stabilizer comprises at least one of a aliphatic mono or dihydroxy alcohol containing 1 to 18 carbon atoms, cyclohexyl alcohol and alkyl substituted thioureas, containing 1 to 4 carbon atoms in the alkyl groups, wherein the trichloroethylene is present in an amount of from about 50 to 99.9+ percent by weight of the composition, the white phosphorus is present in an amount of at least about 0.0001 percent by weight of the composition and the stabilizer is present in an amount of at least about 0.0002 percent by weight of the composition.

2. The composition as claimed in claim 1 wherein the stabilizer comprises a first component selected from said aliphatic alcohols and cyclohexyl alcohol and as a second component said thioureas.

3. The composition as claimed in claim 2 wherein the first component of the stabilizer composition is present in an amount within the range of about 50 to 99.9% by weight of the stabilizer composition and the second stabilizer component is present in an amount within the range of about 0.1 to 50% by weight of the stabilizer composition.

4. The composition as claimed in claim 3 wherein the first stabilizer composition component is n-butyl alcohol.

5. The composition as claimed in claim 3 wherein the second stabilizer composition component is 1,3-diethyl-2-thiourea.

References Cited
UNITED STATES PATENTS 2,486,664  1/1949  Marling et al. _____ 106—14

JULIUS FROME, Primary Examiner

L. B. HAYES, Assistant Examiner

U.S. Cl. X.R.

106—1; 117—47; 148—6.15; 204—30